United States Patent [19]

Kempter et al.

[11] 4,340,455
[45] Jul. 20, 1982

[54] POLYADDUCT/POLYCONDENSATE CONTAINING BASIC NITROGEN GROUPS, AND ITS USE

[75] Inventors: Fritz E. Kempter, Mannheim; Eberhard Schupp, Schwetzingen, both of Fed. Rep. of Germany

[73] Assignee: BASF Aktiengesellschaft, Fed. Rep. of Germany

[21] Appl. No.: 281,920

[22] Filed: Jul. 9, 1981

[30] Foreign Application Priority Data

Jul. 16, 1980 [DE] Fed. Rep. of Germany ....... 3026873

[51] Int. Cl.³ .................. C08G 59/50; C08G 59/54; C08L 63/10
[52] U.S. Cl. .................. 204/181 C; 525/490; 528/96; 528/99; 528/100; 528/107; 524/901; 523/402
[58] Field of Search .................. 528/99, 96, 107, 100; 260/29.2 EP; 525/490; 204/181 C

[56] References Cited

U.S. PATENT DOCUMENTS

| | | | |
|---|---|---|---|
| 3,312,664 | 4/1967 | Bremmer | 260/47 |
| 3,365,471 | 1/1968 | Becke et al. | 260/348 |
| 3,391,097 | 7/1968 | Williamson | 260/18 |
| 3,450,711 | 6/1969 | Megna et al. | 260/326 |
| 3,503,979 | 3/1970 | Habermeier et al. | 260/260 |
| 3,839,252 | 10/1974 | Bosso et al. | 260/29.2 EP |
| 3,950,451 | 4/1976 | Suzuki et al. | 525/490 |
| 3,994,989 | 11/1976 | Kempter et al. | 525/490 |
| 4,001,155 | 1/1977 | Kempter et al. | 525/490 X |
| 4,269,742 | 5/1981 | Goeke et al. | 528/96 |

FOREIGN PATENT DOCUMENTS

| | | |
|---|---|---|
| 2541801 | 9/1975 | Fed. Rep. of Germany . |
| 2606831 | 2/1976 | Fed. Rep. of Germany . |
| 2541234 | 4/1976 | Fed. Rep. of Germany . |
| 2603666 | 8/1976 | Fed. Rep. of Germany . |
| 2711425 | 3/1977 | Fed. Rep. of Germany . |
| 2755906 | 12/1977 | Fed. Rep. of Germany . |
| 2554080 | 6/1980 | Fed. Rep. of Germany . |
| 1172916 | 12/1969 | United Kingdom . |

OTHER PUBLICATIONS

Houben-Weyl, Methoden der Organischen Chemie, vol. XI/1, pp. 731–747 (1957).

Primary Examiner—Earl A. Nielsen
Attorney, Agent, or Firm—Keil & Witherspoon

[57] ABSTRACT

A polyadduct/polycondensate, which is water-dilutable when protonated with an acid, and which contains basic nitrogen groups, is obtained by polyaddition reaction of (A) Mannich bases obtained from monophenols and/or polyphenols, one or more secondary amines which contain one or more hydroxyalkyl groups, or a mixture of such a secondary amine with another secondary amine, and formaldehyde or a formaldehyde donor, with (B) an epoxy resin, the polyadduct/polycondensate of (A) and (B) containing groups, bonded to aromatic rings, of the formula (I)

$$-CH_2-N\begin{array}{c}C(=O)-CH_2\\ \diagdown \\ C(=O)-C(H)-R^1\end{array}\quad (I)$$

with or without groups of the general formula II $$-CH_2-NH-\overset{O}{\overset{\|}{C}}-CHR^2-CHR^3-N\diagup\begin{array}{c}R^4\\ R^5\end{array}\quad (II)$$

where $R^1$ is a polydienyl radical, $R^2$ and $R^3$ are hydrogen or methyl and $R^4$ and $R^5$ are alkyl, hydroxyalkyl or alkoxyalkyl or are linked to one another to form a 5-membered or 6-membered ring.

The polyadduct/polycondensate can be used, for example, as a surface-coating binder for the cathodic electrocoating of metal articles.

7 Claims, No Drawings

POLYADDUCT/POLYCONDENSATE CONTAINING BASIC NITROGEN GROUPS, AND ITS USE

The present invention relates to polyadducts/polycondensates of Mannich bases with an epoxy resin, which are water-dilutable when protonated with an acid, and contain basic nitrogen groups, and to their use for cathodic electrocoating.

German Laid-Open Application DOS No. 2,755,906 discloses surface-coating binders obtained by polyaddition reaction of a Mannich base with an epoxy resin, the Mannich bases used being condensates of a condensed phenol containing two or more phenolic hydroxyl groups per molecule, a butadiene or isoprene homopolymer or copolymer containing

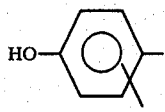

groups, a secondary amine containing a hydroxyalkyl group, and formaldehyde. The phenol-modified polybutadienes used for this purpose are obtained by reacting bisphenol A with polybutadiene, whilst removing the liberated phenol by distillation. This reaction consumes carbon-carbon double bonds, and this can both reduce the iodine number and give an undesirably hard end product.

It is an object of the present invention to provide polyadducts/polycondensates which contain basic nitrogen and which can be prepared without expensive distillative removal of phenol and without consumption of carbon-carbon double bonds by cyclization reactions, so that the associated adverse effect on the properties of the products obtained is avoided.

We have found that this object is achieved by using, for the synthesis of the polyadducts/polycondensates, at least in part a mononuclear or polynuclear monophenol and/or polyphenol which contains groups of the general formula (I)

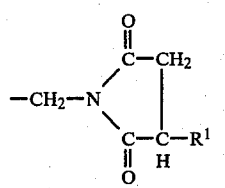

where $R^1$ is a polydienyl radical.

The present invention relates to polyadducts/polycondensates which are water-dilutable when protonated with an acid and which contain basic nitrogen groups, the products being obtained by polyaddition reaction of (A) from 10 to 90% by weight of a Mannich base obtained from (a) monophenols and/or polyphenols, (b) one or more secondary amines which contain one or more hydroxyalkyl groups ($b_1$), or a mixture of such a secondary amine with another secondary amine ($b_2$), and (c) formaldehyde or a formaldehyde donor, with (B) from 10 to 90% by weight of one or more epoxy resins, wherein the polyadduct/polycondensate of (A) with (B) contains groups, bonded to aromatic rings, of the formula (I)

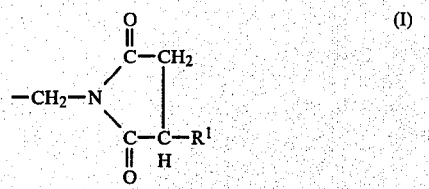

with or without groups of the general formula II

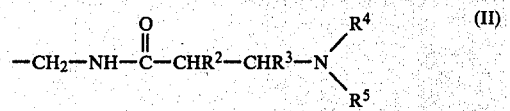

where $R^1$ is a polydienyl radical, $R^2$ and $R^3$ are identical or different and each is hydrogen or methyl and $R^4$ and $R^5$ are identical or different and each is alkyl of 1 to 9 carbon atoms or hydroxyalkyl or alkoxyalkyl of 2 to 10 carbon atoms, or which are linked to one another to form a 5-membered or 6-membered ring.

Preferably, the monophenols and/or polyphenols used to prepare the Mannich base (A) consist of ($a_1$) one or more mononuclear or polynuclear monophenols and/or polyphenols, of which at least a proportion consists of ($a_2$) a mononuclear or polynuclear monophenol and/or polyphenol which contains groups of the general formula (I)

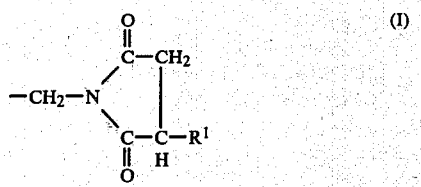

with or without groups of the general formula (II)

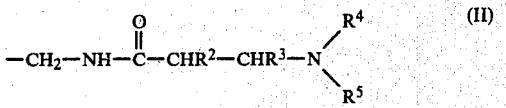

where $R^1$ to $R^5$ have the above meanings. Further, preferred polyadducts/polycondensates are those which have been prepared using, as component (B), a reaction product of a polyepoxide compound with less than the equivalent amount of a mononuclear or polynuclear monophenol and/or polyphenol ($a_2$).

Preferably, diethanolamine is used as component ($b_1$) or a mixture of diethanolamine and another secondary amine is used as component ($b_2$), and a reaction product of a mononuclear or polynuclear monophenol and/or polyphenol with an N-methylolpolydienylmaleimide, plus, if desired, N-methylolacrylamide or N-methylolmethacrylamide (in which last-mentioned cases an addition reaction of the secondary amine at the carbon-carbon double bond of the acrylamide or methacrylamide takes place) is used as component ($a_2$).

The polyaddition reaction is always preceded by a polycondensation.

The novel polyadducts/polycondensates are not only simpler to prepare than the surface-coating binders described in German Laid-Open Application DOS No. 2,755,906, since no expensive distillation of phenol is involved, but also do not lose any carbon-carbon double bonds in the course of the incorporation of the methylenepolydienylmaleimide groups via the Tcherniac-Einhorn reaction.

As regards the optional measure of introducing the groups of the general formula (II), it is to be noted that secondary amines undergo a Michael addition reaction at the carbon-carbon double bond of the group

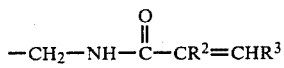

prior to the Mannich reaction, thereby virtually completely consuming the carbon-carbon double bond.

It is however also possible, for example, to follow the Tcherniak-Einhorn reaction of polybutadiene-N-methylolmaleimide and acrylamide or methacrylamide by the Michael addition reaction and then to react the phenolic groups of the resulting reaction product with an excess of polyepoxide, after which the epoxide groups remaining in the product thus obtained are reacted with a Mannich base.

Reaction products of (A) and (B) which contain the group

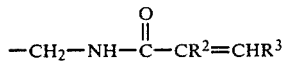

can also be prepared by the method just described. Because of the possibility of reaction with amines which can be present during the preparation and in the surface-coating baths, this method is less advantageous.

The following details may be noted in respect of the components from which the novel polyadducts/polycondensates are synthesized.

(A) Preparation of the Mannich base (a) Suitable mononuclear or polynuclear monophenols or polyphenols ($a_1$) are phenol and its monoalkyl and dialkyl derivatives, alkyl being of 1 to 18 carbon atoms, for example o- and p-cresol, p-tert.-butylphenol, naphthols, eg. α- and β-naphthol, ®Cardanol, and, in particular, polyhydric phenols which contain one or more aromatic radicals, preferably bisphenol A or novolacs.

Particularly suitable components (a) are phenols of the general formula

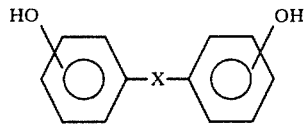

where the OH groups are in the ortho- and/or paraposition to X, and X is a straight-chain or branched divalent aliphatic radical of 1 to 3 carbon atoms or is $>SO_2$, $>SO$, $>S$, $>C=O$ or $-O-$; a preferred compound is bisphenol A. The alkyl derivatives of these polynuclear phenols may also be used.

Mannich condensates of one or more phenols and/or alkylphenols, a primary amine and formaldehyde or a formaldehyde donor, as described in German Laid-Open Application DOS No. 2,711,385, may also be used as component (A) for the preparation of the novel surface-coating binders.

Suitable phenols for the preparation of these Mannich condensates are phenol and alkylphenols, preferably monoalkylphenols of 1 to 18, especially of 3 to 12, carbon atoms in a straight-chain, branched or cyclic alkyl radical, eg. hexylphenol, nonylphenol, dodecylphenol, tert.-butylphenol and phenylphenol. Nonylphenol (also including, for example, technical-grade nonylphenol containing 85% of 4-nonylphenol), and p-tert.-butylphenol, and mixtures of these alkylphenols with phenol, are preferred.

3-Alkenylphenols, for example ®Cardanol, which can be obtained from cashew nut shell oil and which is stated to consist essentially of 3-(pentadeca-8,11-dienyl)-phenyl, are also suitable. A proportion of the unsubstituted phenol can be replaced by bisphenol A. Suitable primary amines are monoalkylamines of 2 to 13, preferably of 2 to 6, carbon atoms in a straight-chain, branched or cyclic alkyl radical, eg. butylamine, hexylamine and octylamine, and hydroxyl-substituted and alkoxy-substituted monoalkylamines, such as monoethanolamine, monoisopropanolamine, 2-alkoxyethylamines, eg. 2-methoxyethylamine and 2-ethoxyethylamine, and mixtures of these amines.

To prepare these Mannich condensates, usable as component (a), the alkylphenol, primary amine and formaldehyde or formaldehyde donor are advantageously reacted in amounts which provide not less than 1 mole of the primary amine and not less than 2 moles of formaldehyde per 2 moles of phenol or alkylphenol.

Further suitable components (a) are indan derivatives containing phenol groups, as described in U.S. Pat. No. 2,979,534, for example

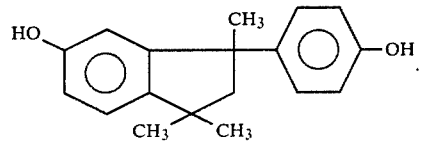

According to the invention, component ($a_1$) is at least partially replaced by component ($a_2$).

Component ($a_2$) is a mononuclear or polynuclear monophenol and/or polyphenol which contains groups of the general formula (I)

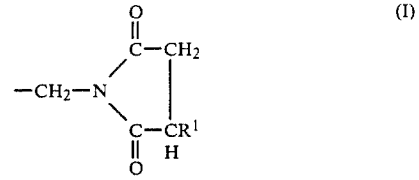

with or without groups of the general formula (II)

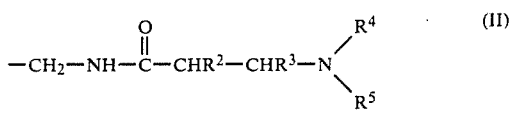

where $R^1$ is a polydienyl radical, $R^2$ and $R^3$ are identical or different and each is hydrogen or methyl and $R^4$ and R⁵ have the above meanings. Groups of the general formula I and groups of the general formula II are in general introduced by the acid-catalyzed Tcherniac-Einhorn reaction of a phenol with the appropriate N-methylol-succinimide which carries a polydienyl radical in the α-position, or with N-methylolacrylamide or N-methylolmethacrylamide, this reaction in general being carried out at from 30° to 150° C., preferably from 50° to 120° C.

Succinimides with polydienyl groups in the α-position are in general obtained by reacting a polydiene with maleic anhydride and then reacting the product with ammonia or an ammonia donor.

Suitable polydienes are polymers of butadiene, isoprene, chloroprene, penta-1,3-diene, cyclopentadiene and piperylene, particularly preferred polydienes being, however, polymers of butadiene having a mean molecular weight of from 200 to 6,000, preferably from 500 to 3,000, and copolymers of butadiene with, for example, styrene, the products having the conventional fine structure in respect of the character of the double bonds (vinyl-1,2 and cis- and trans-1,4, as well as a proportion of cyclic groups). Suitable polydienes of this type in general have iodine numbers of from 100 to 500, preferably from 200 to 450.

The reaction of the polydienes with maleic anhydride is advantageously carried out by conventional methods, employing the usual amounts of maleic anhydride (in general from 5 to 25%, preferably from 10 to 20%), in accordance with the mean molecular weight of the polydiene. Similar remarks apply to the subsequent conversion of the adduct to the imide by means of ammonia or an ammonia donor, for example urea (cf. German Laid-Open Application DOS No. 2,728,470), ammonium carbonate and the like.

The incorporation of the group (I), with or without group (II), provides additional crosslinking capabilities.

(b) Suitable secondary amines (b) are those of the general formula

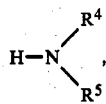

where R⁴ and R⁵ have the above meanings.

Examples of suitable secondary amines (b₁), which contain one or more hydroxyalkyl groups, are alkylethanolamines and alkylisopropanolamines, alkyl being of 1 to 6 carbon atoms. However, dialkanolamines, especially diethanolamine, and mixtures of such alkanolamines or dialkanolamines with other secondary amines (b₂) are preferred.

The secondary amines (b₁), which are incorporated into the Mannich bases (A) as diethanolaminomethyl groups and alkylethanolaminomethyl groups are very important in determining the degree of dispersibility of the binders over the desired pH range of from 6.0 to 10.0, and in part in respect of the crosslinking of the system.

Suitable secondary alkylamines (b₂), which may or may not be employed together with the hydroxyalkyl-containing amines in preparing the Mannich bases (A) are those of the general formula

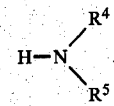

where R⁴ and R⁵ have the above meanings. Examples of such suitable secondary amines are di-n-butylamine, di-n-propylamine, diisopropylamine, di-n-pentylamine, di-n-hexylamine, di-n-octylamine, di-2-ethylhexylamine and di-2-alkoxyethylamines, eg. di-2-methoxyethylamine, di-2-ethoxyethylamine and di-2-butoxyethylamine, as well as piperazines, for example N-hydroxyethylpiperazine, morpholine, piperidine and, preferably, N,N,N'-trimethylalkylenediamines.

The secondary amines (b) are used both in the preparation of the Mannich bases and also in the Michael addition reaction, if the latter is carried out. The effect of the secondary amines (b₂) is primarily that they influence the stability characteristics of the binder, but they also affect the leveling and inner plasticization of the surface coatings produced with the binders.

(c) The formaldehyde or formaldehyde donor is preferably used in the form of a solution of formaldehyde or paraformaldehyde, or a mixture thereof, in an alcohol, for example in butanol.

The Mannich bases (A) are prepared in accordance with the conventional methods described in the literature, for example in Houben-Weyl, Methoden der organischen Chemie, Volume XI/1, page 731, 1957. The solvent is chosen in accordance with the different polarity conditions. It is advantageous to use higher alcohols, cycloaliphatics or alkylaromatics alongside polar solvents.

The starting materials are employed in ratios which depend on the particular properties which the end product is to have; the weight ratio of component (a₁) to component (a₂) is from 1:0.1 to 1:20, preferably from 1:0.5 to 1:15, and the weight ratio of the secondary hydroxyl-containing amines to the other secondary alkylamines is from 1:0 to 1:3.

The ratio of the starting materials (a₁), (a₂) and (b) for the preparation of the Mannich base (A) is advantageously such as to provide from about 0.3 to 2.0, preferably from 0.5 to 1.5, molecules of component (b) per phenolic hydroxyl group of the mixture of components (a₁) and (a₂).

Not less than 1 mole of (c) is used per mole of (b) in the preparation of the Mannich base (A).

The properties of the novel polyadducts/polycondensates, especially the properties of the electrocoating bath and of the coatings obtained, can be varied as desired by varying the ratios of the secondary amines. Thus, the dispersibility of the binder, the reactivity, the leveling characteristics, the crosslinking, the resilience of the coating and the corrosion protection it affords depend on the chosen ratio of diethanolamine or alkylethanolamine to di-n-butylamine, di-n-hexylamine, di-2-ethylhexylamine, di-n-octylamine and di-2-alkoxyethylamine.

In a particularly advantageous embodiment of the present invention, the preparation of the Mannich base is carried out with a formaldehyde donor, for example paraformaldehyde, in an amount which is virtually equivalent to the amine component used and is in general not more than 25% in excess thereof, in an alcohol, such as isopropanol or isobutanol, and component (A) is reacted direct, ie. without any subsequent reaction with further formaldehyde, with component (B).

In general, the reaction of component (A) with component (B) is controlled so that the novel polyadducts/polycondensates formed have mean molecular weights from 800 to 5,000, preferably from 1,000 to 3,000.

The reaction of component (A) with component (B) is in general carried out at from 20° to 100° C., especially from 60° to 80° C., preferably in an organic solvent, for example an alcohol of 3 to 6 carbon atoms, a glycol ether, an alkylaromatic, eg. toluene etc., or a cycloaliphatic. This temperature range is advantageously also chosen for the Michael reaction.

To prepare the novel electrocoating binders, from 10 to 90% by weight, preferably from 20 to 60% by weight, of the Mannich condensate (A) are reacted with from 10 to 90% by weight, preferably from 40 to 80% by weight, of epoxy resin (B). The degree of etherification of the phenolic components ($a_1$ and $a_2$) with the epoxy resin (B) can be used to vary, in particular, the stability of the binder or of the coating bath, but also other important properties, for example the electrical breakdown strength.

(B) Suitable epoxy resins are the conventional polyepoxide compounds, preferably polyepoxide compounds having 2 or 3 epoxide groups in the molecule, for example reaction products of polyhydric phenols, especially those of the formula mentioned under ($a_1$), namely,

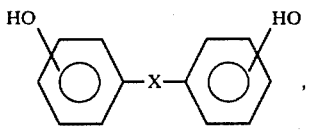

with epichlorohydrin, but also the reaction products, mentioned above, of polyhydric alcohols, for example pentaerythritol, trimethylolpropane or glycerol, with epichlorohydrin. Suitable products can be derived from any diol or polyol, which may or may not contain ether groups, and after introduction of the glycidyl radical the product may still contain some free alcoholic OH groups or be entirely devoid of such groups. Reaction products, still containing epoxide groups, of epoxy resins with primary or secondary amines or with hydroxyl-containing glycol ethers may also be used, as may epoxy resins which contain hetero-atoms, such as sulfur. Epoxy resins containing blocked urethane groups, as described in German Laid-Open Applications DOS No. 2,554,080 and DOS No. 2,541,801, are also suitable. Quite generally, all resins which contain 1,2-epoxide groups and are derived from polyacrylate, polyether, polyester and polyurethane resins, or from polybutadiene oils and other oils, may also be used.

Other suitable compounds derived from resins and containing epoxide groups are nitrogen-containing diepoxides, as described in U.S. Pat. No. 3,365,471, epoxy resins derived from 1,1-methylene-bis-(5-substituted hydantoin), as described in U.S. Pat. No. 3,391,097, diepoxides of bis-imides as described in U.S. Pat. No. 3,450,711, epoxidized aminomethyl-diphenyl oxides as described in U.S. Pat. No. 3,312,664, aliphatic and heterocyclic N,N'-diglycidyl compounds, for example as described in U.S. Pat. No. 3,503,979, aminoepoxyphosphonates as described in British Pat. No. 1,172,916, 1,3,5-triglycidyl isocyanurates and further materials, containing epoxide groups, known in the art.

In order to achieve the higher functionality of component (B) which is preferred for resin formation from components (A) and (B), component (B) can, if desired, be reacted with a diisocyanate, eg. hexamethylene diisocyanate or toluylene diisocyanate, or with a polyisocyanate. For example, epoxide compounds which in addition to an epoxide group contain other functional groups, for example OH groups, can be reacted with diisocyanates. Where appropriate, the epoxy resins can be reacted further with partially blocked diisocyanates and polyisocyanates.

The novel polyadduct/polycondensate obtained from components (A) and (B) is substantially free from epoxide groups and in particular should, at the use stage, not contain more than 0.5 epoxide group per molecule of the product. Excess epoxide groups present after the preparation of the binder can, where necessary, be removed by reaction with mercaptans and/or acids.

The novel polyadduct/polycondensate (solid resin) in general contains from 1 to 35, preferably from 3 to 25, percent by weight of group (I) and up to 20% by weight of group (II).

Suitable additives to the novel polyadducts/polycondensates include polybutadiene oils and other hydrocarbon oils, as well as compounds containing blocked urethane groups, as described, for example, in German Laid-Open Applications DOS No. 2,711,425 and DOS No. 2,755,907. The binders described in German Laid-Open Application DOS No. 2,606,831 may also be used as additives.

The polyadducts/polycondensates according to the invention can be diluted with the conventional surface-coating solvents, such as alcohols of 4 to 16 carbon atoms, eg. isopropanol, decanol, n-butanol and isobutanol, alkylaromatics, eg. toluene, and cycloaliphatics, or with aqueous organic solvents or solvent mixtures, and are applied, with or without admixture of pigments, fillers and conventional auxiliaries, to the substrate to be coated, for example to wood, metal, glass or ceramic, by conventional surface-coating methods, such as spraying, dipping or flooding; the coating is then dried and hardened at above 170° C. The coatings thus obtained are distinguished by, for example, great hardness and resistance to solvents.

Preferably, however, the novel surface-coating binders are employed protonated with acids, for example phosphoric acid and its derivatives or, preferably, water-soluble carboxylic acids, eg. acetic acid, formic acid or lactic acid. The protonated surface-coating binder is water-dilutable and can be applied using the conventional coating methods mentioned above, again giving coatings having very valuable properties. However, the degree of protonation should be kept as low as possible.

The preferred use of the protonated surface-coating binders according to the invention is the cathodic electrocoating of electrically conductive substrates, for example metal articles, sheets and the like made of brass, copper, aluminum, iron and steel, which may or may not be chemically pretreated, for example phosphatized.

The aqueous solutions or dispersions of the novel surface-coating binders, which are at least partially in the form of a salt of a water-soluble carboxylic acid, can also contain auxiliaries which can be cataphoretically deposited as a mixture with the novel binders, examples of such auxiliaries being pigments, soluble dyes, solvents, flow improvers, stabilizers, hardening catalysts, especially the manganese naphthenates and octoates and cobalt naphthenates and octoates which accelerate autoxidative hardening, as well as metal salts of the prior art, as mentioned, for example, in German Laid-Open Applications DOS No. 2,541,234 and DOS No. 2,457,457, anti-foams and other additives and auxiliaries.

The novel surface-coating binders can be used both as the principal base resin for electrocoating and as the base resin in the pigment paste. Alternatively, the resin can be used as the principal base resin for the electrocoating composition, in combination with a conventional pigment paste, or can be used as the base resin in the pigment paste, in combination with a conventional polyamine-containing base resin for the cathodic electrocoating process. The amine-containing cationic electrocoating resins are known and do not require detailed description here. Suitable resins also include resins containing tertiary amine salts, as disclosed in German Laid-Open Application DOS No. 2,603,666, and resins containing quaternary ammonium groups, as described in U.S. Pat. No. 3,839,252.

For cathodic electrocoating, the solids content of the electrocoating bath is in general brought to 5–20% by weight by dilution with demineralized water. The deposition is in general carried out at from 15° to 40° C. for a period of from 1 to 2 minutes at a bath pH of from 6.0 to 10.2, preferably from 7.0 to 9.5, and at a deposition voltage of from 50 to 500 volt. After the film which has been cathodically deposited on the electrically conductive article has been rinsed, it is hardened for from 10 to 30 minutes at about 150°–220° C., preferably for 20 minutes at 170°–200° C.

The novel polyadducts/polycondensates, when used for cathodic electrocoating, give coatings having excellent mechanical properties, such as great hardness and scratch resistance, coupled with very good resilience and firm adhesion to the substrate.

Furthermore, the coatings obtained have good solvent resistance and resistance to the salt spray test.

In the Examples, parts and percentages are by weight.

EXAMPLE 1

(a) Preparation of the polybutadiene-maleimide 825 parts of a polybutadiene oil having an iodine number of 420 and a molecular weight of about 900, and containing 40–50% of 1,2-vinyl groups, 30–35% of trans-1,4-groups and 25–30% of cis-1,4 groups (for example Lithene PL from Metallgesellschaft), 175 parts of maleic anhydride, 50 parts of xylene and 0.1 part of N,N-diphenyl-1,4-phenylenediamine are reacted for 1 hour at 170° C. and then for 6 hours at 190° C. under a stream of nitrogen. 43.5 parts of urea are then added in the course of about 1 hour at 160° C. Thereafter the mixture is stirred for 3 hours at 190° C., with elimination of water. 227 parts of toluene, 51.5 parts of paraformaldehyde, 598.2 parts of bisphenol A and 0.17 part of phenothiazine are then added at 120° C. After reaction for 2.5 hours at 120° C., 2.4 parts of p-toluenesulfonic acid, dissolved in 15.2 parts of isopropanol, are added dropwise, and the mixture is stirred for 2 hours at 120° C. It is then brought to a theoretical solids content of 75% by adding 290.3 parts of toluene. The actual solids content proves to be 75.5%.

(b) Preparation of the polyadduct/polycondensate 77.4 parts of diethanolamine, 59 parts of di-n-butylamine, 93 parts of the polybutadiene-maleimide prepared as described under (a), 104.5 parts of bisphenol A, 60 parts of isobutanol and 41 parts of paraformaldehyde are stirred for 15 minutes at 50° C. and then for 2.5 hours at 80° C. Thereafter, 70 parts of a glycidyl ether obtained from bisphenol A and epichlorohydrin (eg. Epoxi 1/33 from Chemapol, Czechoslovakia), having an epoxide value of 0.2, 51 parts of a diglycidyl ether obtained from bisphenol A and epichlorohydrin (for example Epikote 162 from Shell), having an epoxide value of 0.62, 32 parts of isopropanol and 32 parts of ethylglycol are added. The mixture is allowed to continue reacting at 70° C. until the viscosity reaches 600 mPa.s (measured by means of an ICI plate-and-cone viscometer at 75° C.). The reaction time required is about $4\frac{1}{4}$ hours. The reaction is then stopped by adding 2.7 parts of mercaptoethanol, 70 parts of fully demineralized water and 0.5 part of acetic acid. The solids content of the binder is 63.6%.

(c) Electrocoating and testing

To prepare a 10% strength coating bath, 100 parts (calculated as solids) of the resin obtained from (b) are protonated with 1.4% of acetic acid and diluted to 1,000 parts with fully demineralized water. The coating bath is stirred for 48 hours at 30° C.; it has a pH of 8.0 and a conductivity of $1.2 \times 10^{-3}$ S.cm$^{-1}$. After thorough stirring, 100 ppm (based on bath volume) of copper are added as an aqueous copper acetate solution. On phosphatized steel sheets, deposition for 2 minutes at 80 volt and 30° C., and hardening for 20 minutes at 180° C., gives a smooth 15 μm thick coating. Finally, 300 ppm (based on bath volume) of lead are added as an aqueous lead acetate solution. On phosphatized steel sheets, deposition for 2 minutes at 80 volt and 30° C., and hardening for 20 minutes at 180° C., gives a smooth 15 μm thick coating. On non-pretreated steel sheets, deposition for 2 minutes at 20 volt and 30° C., and hardening for 20 minutes at 180° C., gives a 15–20 μm thick coating. The DIN 50,021 corrosion test, carried out for 14 days, gave a penetration of 0.8–1.5 mm, measured from the cut, in the case of the iron-phosphatized water-rinsed and air-dried steel sheets (Bonder ® 1040 WL) which were coated after the addition of the copper. Iron-phosphatized water-rinsed and air-dried steel sheets (Bonder ® 1041 WL) which were coated after addition of both copper and lead to the bath showed a penetration of 0.3–2.3 mm, whilst on the non-pretreated steel sheets the penetration was 1.5 mm (in each case measured from the cut).

EXAMPLE 2

(a) 825 parts of the polybutadiene oil mentioned in Example 1(a), 175 parts of maleic anhydride, 50 parts of xylene and 0.1 part of N,N-diphenyl-1,4-phenylenediamine are reacted for 1 hour at 170° C., and then for 6 hours at 190° C., under a stream of nitrogen. 43.5 parts of urea are then added in the course of about 1 hour at 160° C. The mixture is then stirred at 190° C. for 3 hours, with elimination of water. 227 parts of toluene, 51.5 parts of paraformaldehyde, 598.2 parts of bisphenol A and 0.17 part of phenothiazine are then added at 120° C. After a reaction time of 2.5 hours at 120° C., 2.4 parts of p-toluenesulfonic acid dissolved in 15.2 parts of isopropanol are added dropwise and stirring is continued for 2 hours at 120° C. The batch is then brought to a theoretical solids content of 75% by adding 290.3 parts of toluene. The actual solids content proves to be 75.5%.

(b) Preparation of a urethane-containing epoxy resin 387.7 parts of a half-blocked toluylene diisocyanate, obtained from 273.6 parts of an 80/20 toluylene diisocyanate isomer mixture by adding 157.2 parts of cyclohexanol at 90° C. in the course of one hour and then continuing the reaction for 15 minutes at the same temperature, are added dropwise, in 1 hour, to 651 parts of a diglycidyl ether obtained from bisphenol A and epichlorohydrin (Epikote 162 from Shell), having an epoxide value of 0.62, at 90° C. Stirring is then continued for 1 hour at 90° C., after which the batch is diluted with 311.3 parts of ethylglycol to a solids content of 77.0%.

(b$_2$) Preparation of a polyadduct/polycondensate 104.5 parts of bisphenol A, 59 parts of di-n-butylamine, 15.5 parts of paraformaldehyde, 120.5 parts of the polybutadiene-maleimide prepared under (a) and 60 parts of isobutanol are reacted for 75 minutes at 80° C. 77 parts of a glycidyl ether obtained from bisphenol A and epichlorohydrin (for example Epoxi 1/33 from Chemapol, Czechoslovakia), having an epoxide value of 0.2, are then added. Thereafter the reaction is continued for 2 hours at 80° C. 25.5 parts of paraformaldehyde are then added, and 77.5 parts of diethanolamine are introduced dropwise in the course of 10 minutes. The batch is then stirred for a further 2 hours at 80° C. 114 parts of the blocked urethane-containing epoxy resin (b$_1$) and 31 parts of ethylglycol are then introduced and the reaction is continued at 70° C. until a viscosity of 1,450 mPa.s (measured by means of an ICI plate-and-cone viscometer at 75° C.) is reached; the reaction time required for this is about 3.5 hours. Thereafter, the reaction is stopped by adding 1 part of mercaptoethanol, 0.9 part of acetic acid and 70 parts of fully demineralized water. The solids content of the binder is 65.4%.

(c) Electrocoating and testing

To prepare a 10% strength coating bath, 100 parts (calculated as solids) of the resin obtained from (b$_2$) are protonated with 2% of acetic acid and diluted to 1,000 parts with fully demineralized water. The coating bath is stirred for 48 hours at 30° C.; it has a pH of 7.4 and a conductivity of $1.65 \times 10^{-3}$ S.cm$^{-1}$. After thorough stirring, 100 ppm (based on bath volume) of copper are added as an aqueous copper acetate solution. On phosphatized steel sheets, deposition for 2 minutes at 100 volt and 30° C., and hardening for 20 minutes at 180° C., gives a smooth 15 μm thick coating. On non-pretreated steel sheets, deposition for 2 minutes at 75 volt and 30° C., and hardening for 20 minutes at 180° C., gives a smooth 17 μm thick coating. Finally, 300 ppm (based on bath volume) of lead are added as an aqueous lead acetate solution. On phosphatized steel sheets, deposition for 2 minutes at 110 volt and 30° C., and hardening for 20 minutes at 180° C., gives a smooth 15 μm thick coating.

The DIN No. 50,021 corrosion test, carried out for 14 days, gave a penetration of 0.7–2.2 mm, measured from the cut, in the case of the iron-phosphatized water-rinsed and air-dried steel sheets (Bonder ® 1041 WL) which were coated after the addition of the copper. The non-pretreated steel sheets showed a penetration of 1.8–4 mm (measured from the cut). The iron-phosphatized, water-rinsed and air-dried steel sheets (Bonder ® 1041 WL) which were coated after addition of copper and lead showed a penetration of 0.5–1.5 mm.

We claim:

1. A polyadduct/polycondensate which is water-dilutable when protonated with an acid and which contains basic nitrogen groups, the product being obtained by polyaddition reaction of (A) from 10 to 90% by weight of a Mannich base obtained from (a) monophenols and/or polyphenols, (b) one or more secondary amines which contain one or more hydroxyalkyl groups (b$_1$), or a mixture of such a secondary amine with another secondary amine (b$_2$) and (c) formaldehyde or a formaldehyde donor, with (B) from 10 to 90% by weight of one or more epoxy resins, wherein the polyadduct/polycondensate of (A) with (B) contains groups, bonded to aromatic rings, of the formula (I)

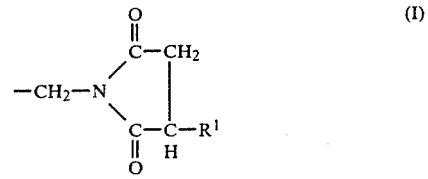

with or without groups of the general formula II

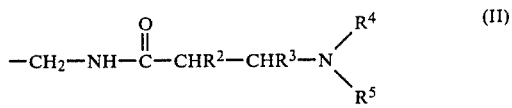

where R$^1$ is a polydienyl radical, R$^2$ and R$^3$ are identical or different and each is hydrogen or methyl and R$^4$ and R$^5$ are identical or different and each alkyl of 1 to 9 carbon atoms or hydroxyalkyl or alkoxyalkyl of 2 to 10 carbon atoms, or which are linked to one another to form a 5-membered or 6-membered ring.

2. A polyadduct/polycondensate as claimed in claim 1, wherein the component (b) used to prepare the Mannich base (A) is either (b$_1$) diethanolamine or a mixture of diethanolamine and another secondary amine (b$_2$).

3. A polyadduct/polycondensate as claimed in claim 1, wherein the monophenols or polyphenols, or mixtures of monophenols and polyphenols, used to prepare the Mannich base (A) are (a$_1$) one or more mononuclear or polynuclear monophenols and/or polyphenols, of which at least a proportion is replaced by (a$_2$) a mononuclear or polynuclear monophenol and/or polyphenol which contains groups of the general formula (I)

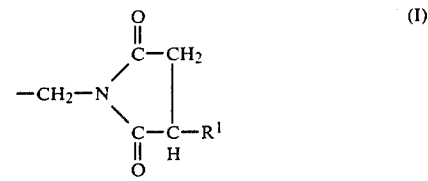

with or without groups of the general formula (II)

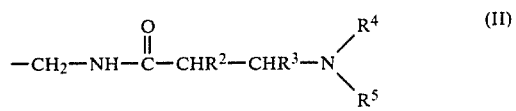

where $R^1$ to $R^5$ have the above meanings.

4. A polyadduct/polycondensate as claimed in claim 2, wherein the monophenols or polyphenols, or mixtures of monophenols and polyphenols, used to prepare the Mannich base (A) are
 ($a_1$) one or more mononuclear or polynuclear monophenols and/or polyphenols, of which at least a proportion is replaced by
 ($a_2$) a mononuclear or polynuclear monophenol and/or polyphenol which contains groups of the general formula (I)

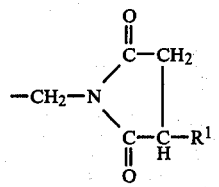 (I)

with or without groups of the general formula (II)

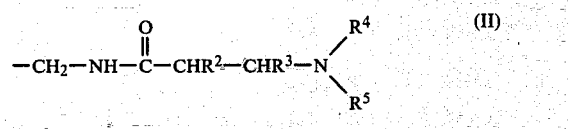 (II)

where $R^1$ to $R^5$ have the above meanings.

5. A polyadduct/polycondensate as claimed in claim 1, wherein component (B) is prepared by reacting a polyepoxide compound with a less than equivalent amount of mononuclear or polynuclear monophenols and/or polyphenols ($a_2$).

6. A polyadduct/polycondensate as claimed in claim 2, wherein component (B) is prepared by reacting a polyepoxide compound with a less than equivalent amount of mononuclear or polynuclear monophenols and/or polyphenols ($a_2$).

7. A process for the cathodic electrocoating of metallic articles, wherein the surface-coating binder used is the polyadduct/polycondensate, which is water-dilutable when protonated with an acid and which contains basic nitrogen groups, as claimed in claim 1.

* * * * *